L. EATON.
Watch Regulator.

No. 235,940.  Patented Dec. 28, 1880.

Attest,
W. H. Knight
Wm. T. Henderson

Leander Eaton,
Inventor,
By H. A. Abbot
Atty.

N. PETERS, PHOTO-LITHOGRAPHER, WASHINGTON, D. C.

UNITED STATES PATENT OFFICE.

LEANDER EATON, OF WORCESTER, MASSACHUSETTS.

WATCH-REGULATOR.

SPECIFICATION forming part of Letters Patent No. 235,940, dated December 28, 1880.

Application filed October 24, 1879.

*To all whom it may concern:*

Be it known that I, LEANDER EATON, of Worcester, in the county of Worcester and State of Massachusetts, have invented certain new and useful Improvements in Watches and Chronometers; and I do hereby declare the following to be a full, clear, and exact description thereof, reference being had to the accompanying drawings, which form a part of this specification.

My invention relates to an improvement in the means for regulating watches and chronometers.

In the ordinary regulator the hair-spring is held firmly in the hair-spring stud and vibrates freely between two pins attached to an adjustable arm, and this arm is moved back and forth in a circle at will by means of a lever termed an "indicator," which extends along the bridge.

Heretofore in regulating a watch it has been customary, either by hand or suitable mechanism, to move this indicator to the right or left, as the case may require, and practice has shown that the regulation of a watch by this means is simply a series of experiments or guess work, and that it may take a number of weeks of close observation to secure accurate time.

The object of my invention is to provide a means for the prompt and ready regulation of a watch-movement to the keeping of accurate time, whereby the distance the sight is to be moved and the exact position it should occupy may be calculated with mathematical accuracy, and the loss of time, expense, and inconvenience of delay may be avoided.

My invention consists, first, of a method of regulating a watch-movement by taking the fast and slow time, respectively, at two positions of the indicator, and ascertaining the amount of both times, and taking the fraction of one as to the whole, and ascertaining with it the relative proportion of the whole distance between the two positions of the indicator as the position the indicator should occupy for the movement to give correct time.

My invention further consists of an indicator for a watch-movement having a movable index-plate or any equivalent operated in connection with an indicator.

Figure 3:
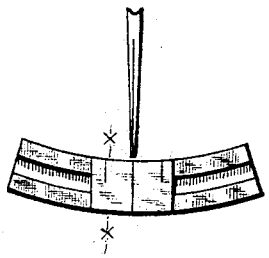
Figure 4:
Figure 1:
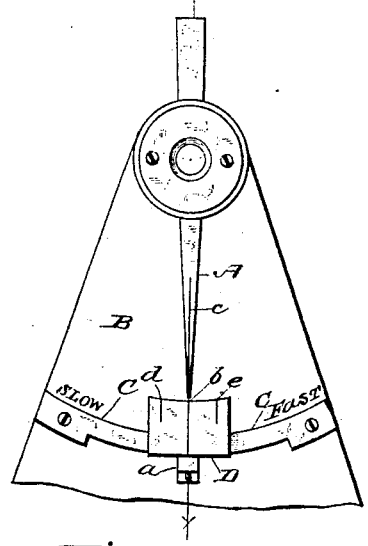
Figure 2:
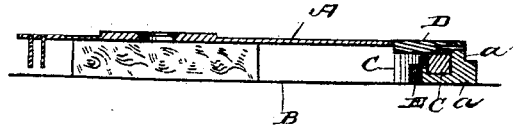
Figure 5:
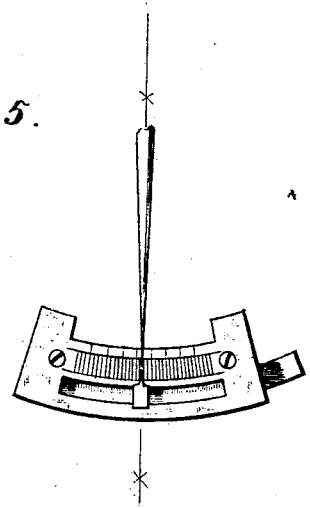
Figure 6:

In the accompanying drawings, Figure 1 is a plan view. Fig. 2 is a section taken upon the line $x\,x$ of Fig. 1. Fig. 3 is a plan view of a modification. Fig. 4 is a section taken on the line $x\,x$ of Fig. 3. Fig. 5 is a plan view of a modification, and Fig. 6 is a section on line $x\,x$ of Fig. 5.

A is an index of a watch, and B represents the bridge, upon and to which a curved frame, C, is attached.

D is an index-plate attached to an arm, $a$, which extends down and beneath the frame C, and is connected with a long flat spring, E, on the inside of the curve of the frame C. The spring E maintains sufficient friction to prevent the movement of the index-plate, except upon the direct application of a slight force. Across the top of the plate D is a line, $b$, which is a continuation of the line $c$, which extends along the center of the indicator A, and on either side of the line $b$, a suitable distance therefrom, are lines $d\,e$.

In regulating, a movement of the indicator toward the line $d$ produces slow time, and the reverse movement of the indicator produces faster time.

In regulating a movement with this device the operation is as follows: Place the central line, $b$, of the index-plate and the line $c$ of the index in juxtaposition, and at the end of one hour compare the time and note the variance from correct time in seconds, finding it to be, say, six seconds fast. Move the indicator to the line $d$, and place the line in continuation of the line $c$, and at the end of one hour compare the time and note the variance from correct time in seconds, finding it to be, say, two seconds slow. Manifestly, then, there is a difference of eight seconds of time in the action of the movement made by moving the indicator from the line $b$ to the line $d$, six of which are fast and two slow. Therefore six-eighths of the space between the lines $b$ and $d$ (being that part of the space adjoining the line $b$) represents fast time, and two-eighths of the space represents slow time. Hence, if the line upon the indicator be moved to a point two-eighths of the distance from the line $d$ toward the line $b$ the movement will give accurate time.

What I claim as new, and desire to secure by Letters Patent, is—

1. In a regulator, an adjustable or movable index-plate, substantially as shown and described.

2. In a regulator, an indicator having a central line for operation with a line or lines upon a movable index-plate, substantially as shown and described.

3. In a regulator, the combination of a bridge, indicator, and frame and index-plate, substantially as shown and described.

4. In a regulator, the combination of a frame, spring, arm, and index-plate, substantially as shown and described.

In testimony that I claim the foregoing I have hereunto set my hand.

LEANDER EATON.

Witnesses:
A. M. LONG,
WM. G. HENDERSON.